United States Patent [19]

Heyen et al.

[11] 4,119,083
[45] Oct. 10, 1978

[54] SOLAR ENERGY ABSORBING BODY AND COLLECTOR

[76] Inventors: Wilfred L. Heyen, 711 Florida Rd.;
Keith D. Olinger, P.O. Box 2031,
both of Durango, Colo. 81301

[21] Appl. No.: 796,978

[22] Filed: May 16, 1977

[51] Int. Cl.² .............................................. F24J 3/02
[52] U.S. Cl. ................... 126/270; 237/1 A;
428/288; 428/290; 428/436
[58] Field of Search ............... 126/270, 271; 237/1 A;
428/288, 290, 436

[56] References Cited

U.S. PATENT DOCUMENTS

| | | | |
|---|---|---|---|
| 2,998,005 | 8/1961 | Johnston | 126/270 |
| 3,102,532 | 9/1963 | Shoemaker | 126/270 |
| 3,254,703 | 6/1966 | Thomason | 126/271 |
| 3,875,925 | 4/1975 | Johnston | 126/270 |
| 3,940,537 | 2/1976 | Burns | 428/288 |
| 3,987,784 | 10/1976 | Godrick | 126/271 |
| 4,067,316 | 1/1978 | Brin et al. | 126/270 |

*Primary Examiner*—Kenneth W. Sprague
*Assistant Examiner*—James C. Yeung
*Attorney, Agent, or Firm*—Ancel W. Lewis, Jr.

[57] ABSTRACT

A solar energy absorbing body has a plurality of discrete solar energy absorbing surfaces in a random arrangement providing a random array of interstices dispersed throughout the body through which solar radiation passes to strike the absorbing surfaces to become heated and through which a stream of air is passed to transfer heat from the heated surfaces. An effective absorbing surface is provided by fine glass filaments coated with a coating containing a thermosetting synthetic resin in which is mixed highly absorptive fine particles. Collectors containing the absorbing body have wall portions that direct a stream of air in particular flow patterns to and from the absorbing body so as to obtain maximum heat transfer.

9 Claims, 8 Drawing Figures

SOLAR ENERGY ABSORBING BODY AND COLLECTOR

FIELD OF THE INVENTION

This invention generally relates to solar energy apparatus and more particularly to a novel solar energy absorbing body and collector.

BACKGROUND OF THE INVENTION

Recently there has been an intensification of efforts to develop solar energy collectors to convert available solar energy to usable heat. The effectiveness of any solar energy absorbing collector depends to a large extent on its ability to accomplish total solar energy absorption with minimum thermal emission and heat losses along with the capability of readily transferring the heat collected in the absorbing material to a transfer medium such as air or water. Because the amount of solar energy converted is directly related to the surface area of the solar energy absorbing material, it is also important that the cost per square foot be kept to a minimum. Other highly desirable features include resistance to heat and flame because of the temperatures involved, simplicity, durability, weight, and availability of materials.

In the past the solar energy absorbing materials have largely been imperforate metal plates coated with highly absorptive coatings, layers of wire mesh, and a variety of metal plate configurations including spaced vertical plates. For the most part these constructions involve relatively costly metals, costly coating processes and construction techniques, and are comparatively expensive per square foot of surface area.

Accordingly, it is a general object of the present invention to provide a simple, durable, fire-retardant solar energy absorbing body.

Another object of the present invention is to provide a novel solar energy absorbing body wherein there are a relatively large number of discrete absorbing surfaces per unit of area arranged at numerous different angles to intercept incoming solar radiation.

Yet another object of the present invention is to provide a novel solar energy absorbing body that is readily sized to meet specific requirements.

A further object of the present invention is to provide a novel solar energy absorbing body that is relatively inexpensive, easy to handle and easy to fabricate.

Still a further object of the present invention is to provide a novel solar energy collector wherein there is provided substantial airflow in direct contact with the heat absorbing surfaces to remove the heat from those surfaces.

SUMMARY OF THE INVENTION

A solar energy absorbing body is made up of a plurality of fibers defining a plurality of discrete solar energy absorbing surfaces in a random arrangement at different depths relative to an exposed boundary surface of the body and spaced from one another to provide a random array of interstices dispersed throughout the body through which solar radiation passes to strike the discrete absorbing surfaces at different depths within the absorbing body to cause the absorbing surfaces to become heated and through which a stream of air is passed to remove heat from the heated surfaces. A highly effective absorbing surface that is fire retardant is provided by relatively inexpensive spun glass filaments sprayed with a coating containing a water-soluble, thermosetting, synthetic resin in which fine carbon black particles are mixed. The absorbing body of a selected thickness is contained in a support housing having a cover portion that admits solar radiation and has wall portions that direct the stream of air to and from the absorbing body in a particular path. In one form of collector the absorbing body substantially fills a support housing and in another form of collector the incoming cooler air stream is passed through the boundary face through which the incoming solar radiation is passed and out a flow passage at the back side opposite the incoming cooler air.

Other objects, advantages and capabilities of the present invention will become more apparent as the description proceeds, taken in conjunction with the accompanying drawings in which like parts have similar reference numerals and in which.

Figure 1:
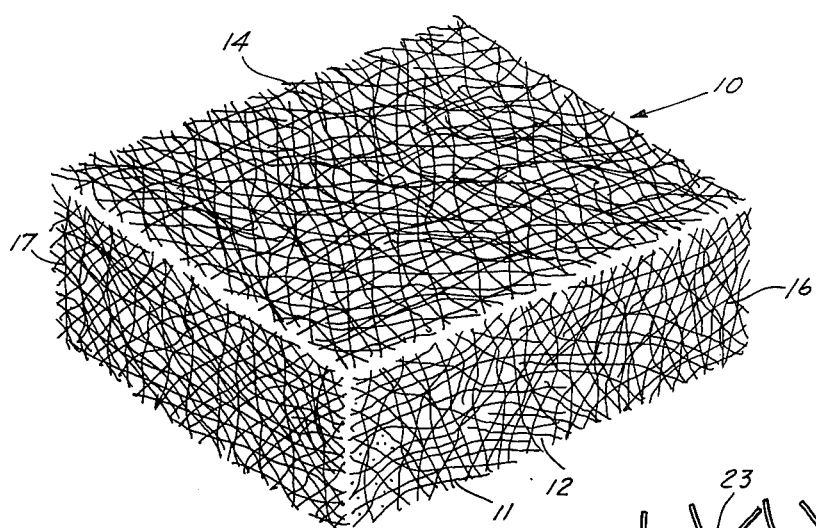
FIG. 1 is a perspective view of a solar energy absorbing body embodying features of the present invention.
Figure 3:
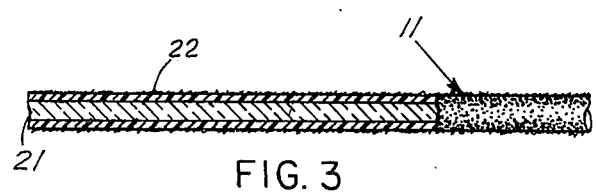
FIG. 3 is an enlarged side elevational view of one coated fiber forming the absorbing body shown in FIGS. 1 and 2 with a portion shown in section.
Figure 2:
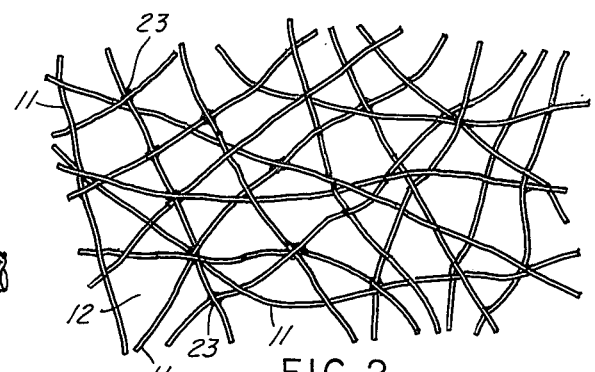
FIG. 2 is an enlarged plan view of a few of the coated fibers forming the absorbing body shown in FIG. 1.

Referring now to the drawings, in FIGS. 1-3 there is shown a solar energy absorbing body designated by numeral 10 made up of a plurality of solar energy absorbing filaments or fibers 11 spaced from one another in a relatively loose, random arrangement to provide a random array of interstices 12 dispersed throughout the absorbing body 10. The solar energy absorbing body 10 shown is generally oblong-shaped to fit the specific support housing hereinafter described and as shown has what is herein described as a top boundary face 14, oppositely disposed side boundary faces 15 and 16, oppositely disposed end boundary faces 17 and 18, and a bottom boundary face 19.

In general, the external surfaces of each of the fibers 11 making up absorbing body 10 are highly absorptive with regard to solar radiation and thereby define a plurality of discrete solar radiation absorbing surfaces in a random arrangement at different depths relative to the top boundary face 14 through which incoming solar radiation passes to strike the absorbing surfaces at different depths relative to the top boundary surface, as described more fully hereinafter. The coated fibers are of a fine size, hair-like in nature, and are loosely packed so that for the most part the interstices 12 are substantially larger than the width of the fibers 11 to permit a stream of air to flow freely therethrough. The stream of air will flow freely in both vertical and horizontal directions. The absorbing body 10, then, may be characterized as substantially wool-like and porous in nature.

An example of a fiber 11 that has been found particularly well suited for the present invention is a core or fiber of spun glass represented in FIG. 3 by numeral 21 impregnated with a coating 22 specifically suited for absorbing solar energy and also connecting the fibers at points of contact for greater body strength.

A coating that has been found to be particularly well suited is a mixture of a thermosetting synthetic resin such as a urea-formaldehyde composition with carbon black particles or powder. The coating 22 consists of a mixture of the resin, carbon black powder, and water to a milk-like consistency. This mixture is sprayed on the spun glass core fibers by a pressurized spray gun to form a dark or black coating which under a microscope has the appearance of a flat black paint. The coated fibers intersect and contact one another and are bonded together by the resin at points of contact designated in the drawings by numeral 23, which are slightly exaggerated in the drawings for purposes of illustration. After the spraying the body is heat-cured in an oven at temperatures of about 130° C. for about 9 minutes. As an alternative the body may be chemically cured using suitable catalysts.

An example of a suitable mixture in parts by volume is three parts carbon black powder, one part thermosetting synthetic resin, and two parts water. A suitable resin which is water-soluble is sold under the trade name PLYAMINE by Reichhold Chemicals, Inc., identified as 21-146 Plyamine B/21-6-0857. This coated filament has the characteristics of being heat resistant and fire retardant. Other solar energy absorbing substances would be those having high solar energy absorptance qualities and mixable in a bonding agent compatible with a filament comparable in size with spun glass. These substances include a chromium oxide powder, aluminum oxide powder, copper oxide powder and lamp black. Typical thicknesses for the absorbing body are 2, 3, 4, 5, and 6 inches.

Figure 4:
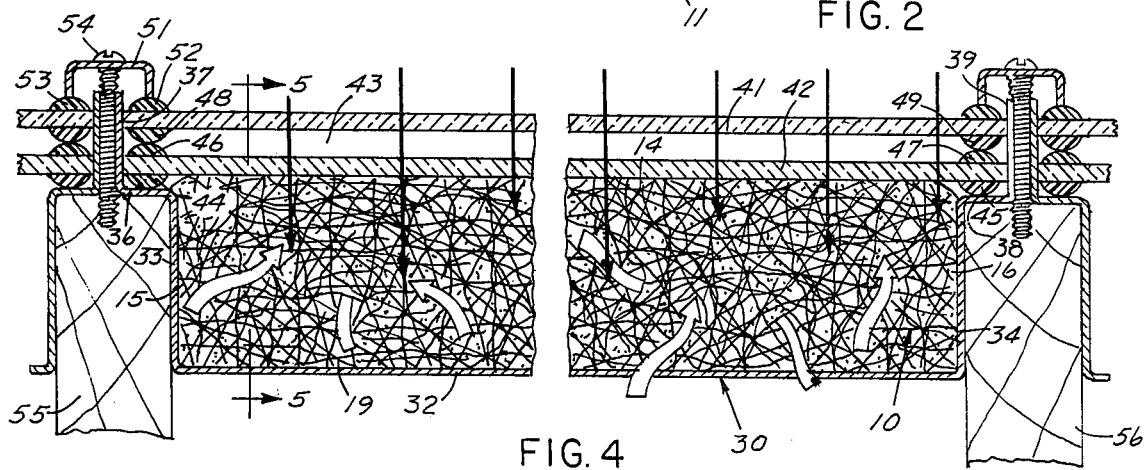
FIG. 4 is an end elevational view of a solar heat collector with the absorbing body shown in FIGS. 1-3 and affixed to a pair of spaced, parallel beams.
Figure 5:
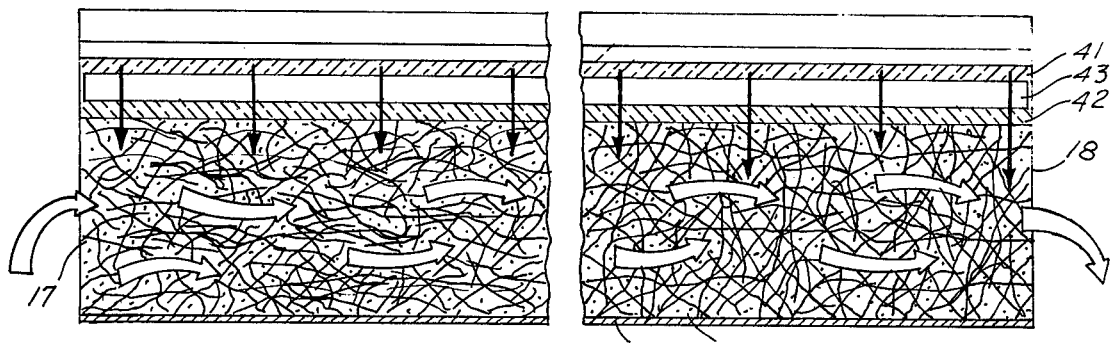
FIG. 5 is a sectional view taken along lines 5—5 of FIG. 4.

Referring now to FIGS. 4 and 5, there is shown a solar energy collector having a container or support member 30 in which there is contained a solar energy absorbing body 10 above described. Support member 30 includes a generally channel-shaped unitary member, preferably shaped from a flat sheet metal, with a flat back wall portion 32 and a pair of opposed side wall portions 33 and 34 projecting up from the opposed marginal edges of the back wall portion. Opposed flange portions include a lateral section 36 and a terminal section 37 parallel to side wall portion 33 but offset therefrom on one side and a lateral section 38 and terminal section 39 on the other side wall portion 34 arranged to slidably receive and support one or more cover sheets. In the embodiment shown in FIGS. 3 and 4 there are illustrated two cover sheets 41 and 42 in spaced parallel relation forming a dead air space 43 which close the top of the channel-shaped member and close off the top of the inner cavity. The solar energy absorbing body 10 is shown to substantially fill the inner cavity. In this embodiment the ends of the support member 30 are shown open and a stream of cooler air is passed into one end and heated air passes out the opposite end, as indicated by arrows in FIG. 4.

The cover sheets 41 and 42 are made of a material such as a rigid glass or fiber glass sheet that is weather-resistant and will transmit solar radiation into the inside of the member 30. The embodiment shown has a cover sheet 42 secured at sealed, water-tight connections along the edges to the flange sections 36 and 39 by beads 44 and 45, preferably of a silicone seal adhesive material.

These sealing beads 44 and 45 extend adjacent the outer edge and extend the full length of the sheets and flanges. Sealing beads 46 and 47 are placed on the outer surface of cover sheet 42 and beads 48 and 49 on the inner surface of cover sheet 41. An inverted U-shaped connector 51 spans the terminal flange sections of two collectors arranged side-by-side with the ends resting on sealing beads 52 and 53 and a screw fastener 54 extends down through the channel 51 and between adjacent terminal flanges of the two collectors into a beam 55 on which the lateral sections of the two adjacent collectors rest. The fastening of the opposite side of the collector to another beam 56 is identical.

In the operation of the embodiment shown in FIGS. 4 and 5, the incoming solar radiation represented by arrows passes through the cover sheets 41 and 42 and strikes the solar energy absorbing surfaces at different depths in the absorbing body 10 in relation to the top boundary surface indicated at 14. This heats the absorbing body. The random arrangement of absorbing surfaces affords the added advantage that any solar radiation that might tend to reflect from one surface within said body will be readily absorbed by an adjacent surface. In addition, heat produced on one discrete absorbing surface within the body is radiated to and absorbed by an adjacent discrete absorbing surface to further contribute to the heating of the absorbing body and the minimizing of heat loss.

At the same time the solar radiation is received, a stream of air is passed into one end of the support member in direct contact with the heated surfaces via the interstices and heated air is passed out the opposite end as indicated by arrows. While the solar radiation is indicated as coming into the collector normal to the cover sheet surface, it is apparent that the random arrangement of absorbing surfaces will be highly effective for a wide range of angles of incidence for the incoming solar radiation.

Figure 6:
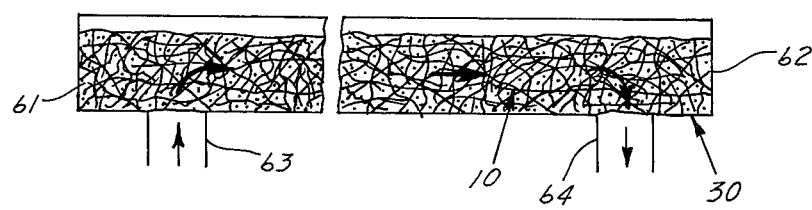
FIG. 6 is a diagrammatic side elevational view of a modified form of solar energy collector embodying features of the present invention.

In FIG. 6 there is illustrated an alternative structure for passing a stream of cooler air into the collector and removing the heated air from the collector. In this form the ends of the member 30 are closed, as indicated by end walls 61 and 62, and an inlet pipe 63 passes cooler air into the back wall portion at one end and an outlet pipe 64 in the back wall portion passes heated air from the collector at the opposite end.

Figure 7:
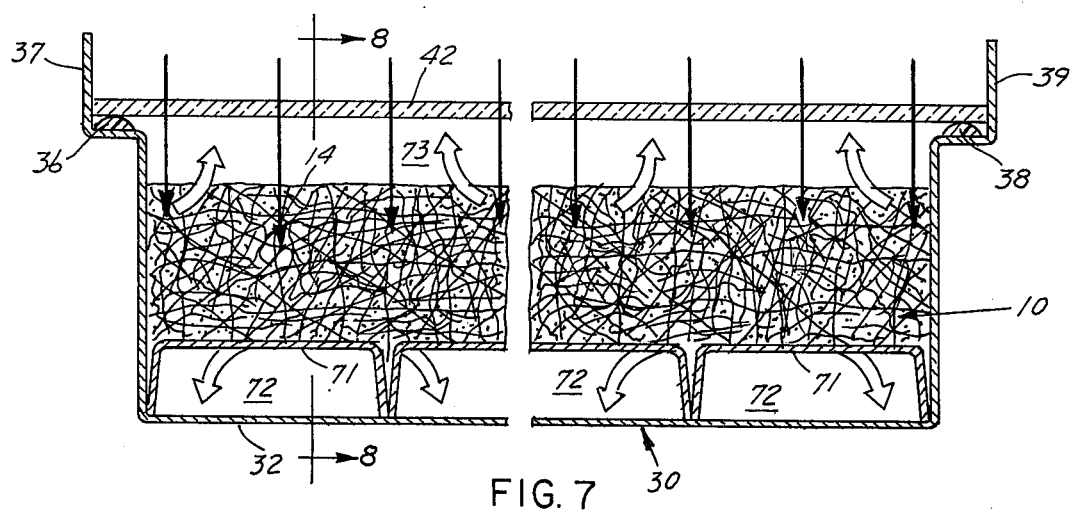
FIG. 7 is an end elevational view of another form of solar energy collector embodying features of the present invention.
Figure 8:
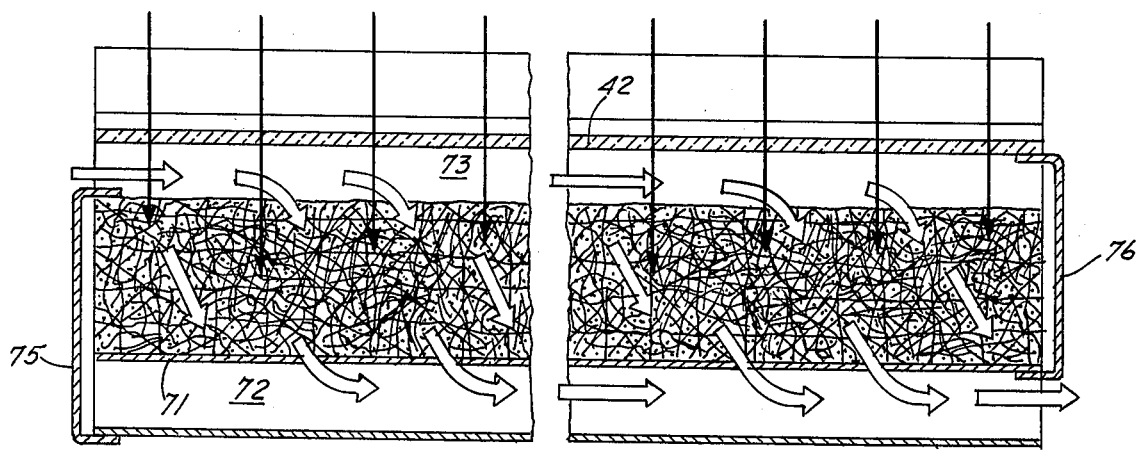
FIG. 8 is a sectional view taken along lines 8—8 of FIG. 7.

Referring now to FIGS. 7 and 8, the collector shown has a modified airflow arrangement whereby the support member 30 containing the absorbing body 10 is essentially of the same construction as above described but with deeper side wall portions. In this embodiment there is provided inverted U-shaped back spacers 71 extending lengthwise of and supported on the back wall portion to hold the absorbing body 10 in spaced relation to the back wall portion to provide a back flow passage 72, and the top boundary face 14 of the absorbing body is spaced from the cover sheet 42 to form a front flow passage 73. At the inlet end of the support member an end closure member 75 covers the back passage and the corresponding end of the solar energy absorbing body so that the incoming cooler air is directed between the inside of the cover sheet and the top boundary face of the absorbing body. At the outlet end an end closure member 76 covers the top passage and the correspondng end of the absorbing body to direct the heated air through the outlet end of the back passage at the opposite end of the collector.

In this form, as indicated by arrows, the cooler air is moved adjacent the incoming solar radiation to reduce heat losses via the cover member and the heated air has an essentially unrestricted flow path through the outlet.

Although the present invention has been described with a certain degree of particularity, it is understood that the present disclosure has been made by way of example and that changes in details of structure may be made without departing from the spirit thereof.

What is claimed is:

1. A solar energy absorbing body comprising:
a plurality of discrete solar energy absorbing surfaces in a random arrangement at different depths relative to a boundary face through which solar radiation is passed, said surfaces being spaced from one another to provide interstices throughout said body through which incoming solar radiation passes to strike a plurality of said discrete absorbing surfaces at different depths relative to said boundary face to cause said surfaces to become heated and through which a stream of air is passed to transfer heat from said surfaces,
said absorbing surfaces being provided by a coating on a loosely arranged mat of glass fibers, said coating being a mixture of carbon black particles and a urea-formaldehyde, water-soluble, adhesive resin that bonds said particles to said glass fibers and said glass fibers together at points of contact and gives strength to the body.

2. A solar energy absorbing body comprising:
a plurality of glass fibers each spray-coated with a fluid mixture including fine carbon black particles and a urea-formaldehyde, water-soluble, adhesive resin that bonds said particles to said fibers and said fibers together at points of contact and defines discrete solar energy absorbing surfaces in a random arrangement at different depths relative to a boundary face through which solar radiation is passed, said surfaces being spaced from one another to provide random interstices through which incoming solar radiation passes to strike a plurality of said discrete absorbing surfaces at different depths relative to said boundary face to cause said surfaces to become heated and through which a stream of air is passed to transfer heat from said surfaces.

3. In a solar energy collector, the combination comprising:
a support housing having an inner cavity and a cover portion through which solar radiation is passed into said cavity; and
a solar energy absorbing body contained in said support housing having a plurality of discrete absorbing surfaces in a random arrangement at different depths relative to a boundary face adjacent said cover portion through which solar radiation is passed, said discrete absorbing surfaces being spaced from one another to provide interstices in a random arrangement through said body through which incoming solar radiation passes to strike a plurality of said discrete absorbing surfaces at different depths relative to said boundary face to cause said surfaces to become heated and through which a stream of air is passed to transfer heat from said surfaces,
said absorbing surfaces being provided by a coating on a loosely arranged mat of glass fibers, said coating being a mixture of carbon black particles and a urea-formaldehyde, water-soluble, adhesive resin that bonds said particles to said glass fibers and said glass fibers together at points of contact and gives strength to the body.

4. In a solar energy collector as set forth in claim 3 wherein said support housing includes a generally channel-shaped unitary member with a back wall portion opposite said cover portion, and opposed side wall portions having laterally and outwardly projecting flange sections along the opposed side edges of said side wall portions adapted to slidably receive and support said cover portion, said cover sheet being in a sealed connection with said laterally projecting flange sections, said lateral flange sections being adapted to support said housing on a pair of spaced, parallel support beams.

5. In a solar energy collector as set forth in claim 4 including spacer means to position said absorbing body in spaced relation to said back portion to provide a back flow passage, said absorbing body having a boundary face in spaced relation to said cover portion to provide a front flow passage, one end of said support housing being closed at one end of said absorbing body to direct an incoming stream of cooler air into one end of said front passage, the opposite end of said support housing adjacent the opposite end of said absorbing body and front flow passage being closed whereby a heated stream of air is discharged via said back flow passage.

6. In a solar energy collector as set forth in claim 3 wherein said solar energy absorbing body substantially fills said inner cavity.

7. In a solar energy collector as set forth in claim 3 wherein said support housing is open at the ends and a stream of air is passed into one end, through the interstices of said absorbing body, and out the opposite end of said support housing.

8. In a solar heat collector as set forth in claim 3 wherein said support housing has an inlet passage in the bottom wall portion adjacent one end for the admission of a stream of cooler air into the support housing in communication with the interstices of said body and an outlet passage in the bottom wall portion adjacent the opposite end for the passing of heated air from said support housing.

9. In a solar energy collector, the combination comprising:
a support housing including a generally channel-shaped unitary member with a back wall portion and opposed side wall portions each with lateral and outwardly extending flange sections on each side wall portion adapted to slidably receive and support a cover sheet in spaced parallel relation to said back wall portion to define an inner cavity, said cover sheet passing solar radiation into said inner cavity; and
a generally wool-like, porous, solar energy absorbing body contained in said cavity made up of a plurality of glass fibers each spray-coated with a fluid mixture including carbon black particles and a urea-formaldehyde water-soluble adhesive resin that bonds the particles to said fibers and said fibers together at points of contact and defines discrete solar energy absorbing surfaces in a random arrangement at different depths relative to a boundary face through which solar radiation is passed, said absorbing surfaces being spaced from one another to provide a random array of interstices dispersed throughout the body through which incoming solar radiation passes to strike a plurality of said discrete solar energy absorbing surfaces at different depths relative to said boundary face to cause said surfaces to become heated and through which a stream of air is passed to transfer heat from said surfaces.

* * * * *